Oct. 21, 1941.  W. H. JOHNSON  2,259,473
ROLLER CLUTCH
Filed Nov. 15, 1939   10 Sheets-Sheet 1
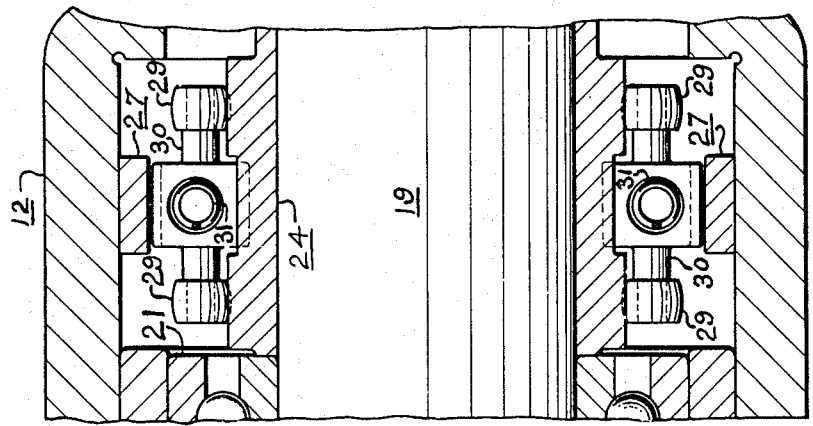
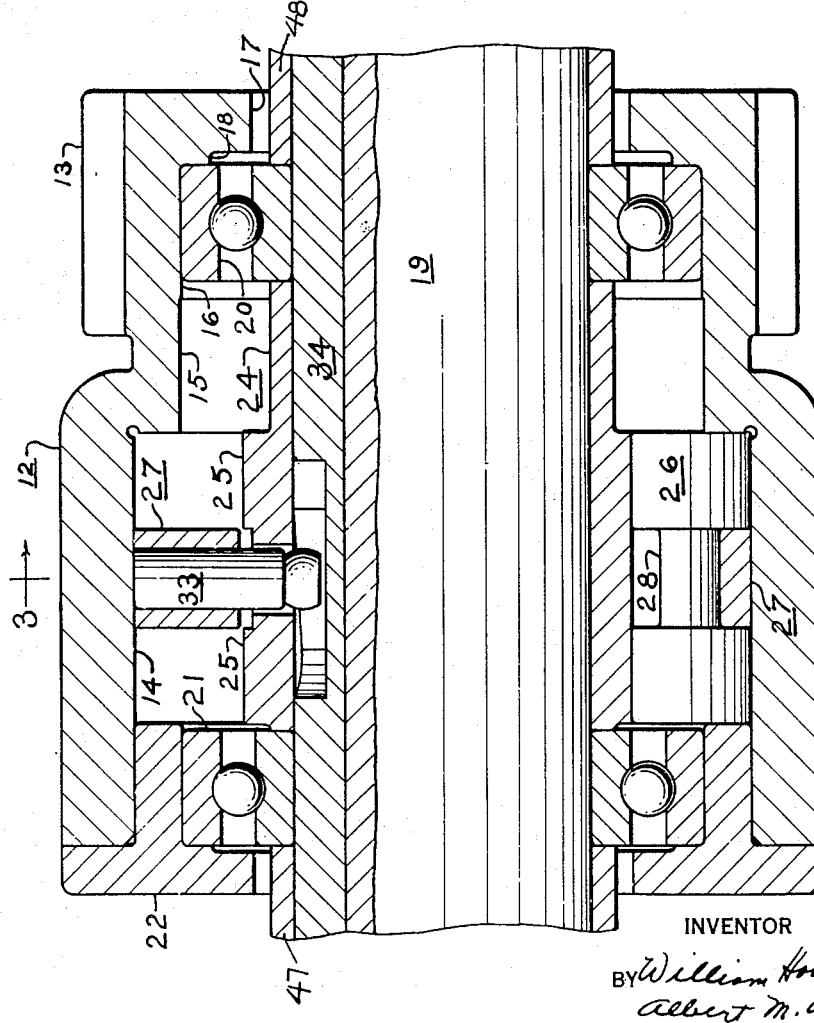
INVENTOR
BY William Horace Johnson
Albert M. Austin
ATTORNEY Oct. 21, 1941.　　　W. H. JOHNSON　　　2,259,473
ROLLER CLUTCH
Filed Nov. 15, 1939　　　10 Sheets-Sheet 2

INVENTOR
*William Horace Johnson*
BY *Albert M. Austin*
ATTORNEY

Oct. 21, 1941. W. H. JOHNSON 2,259,473
ROLLER CLUTCH
Filed Nov. 15, 1939 10 Sheets-Sheet 3

INVENTOR
William Horace Johnson,
BY
Albert N. Austin
ATTORNEY

Oct. 21, 1941.  W. H. JOHNSON  2,259,473
ROLLER CLUTCH
Filed Nov. 15, 1939  10 Sheets-Sheet 4

INVENTOR
William Horace Johnson
BY
Albert M. Austin
ATTORNEY

INVENTOR
William Horace Johnson
BY
Albert M. Austin
ATTORNEY

Oct. 21, 1941.  W. H. JOHNSON  2,259,473
ROLLER CLUTCH
Filed Nov. 15, 1939    10 Sheets-Sheet 7
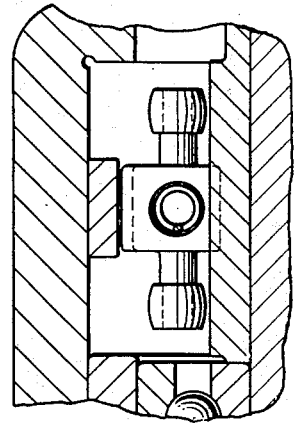
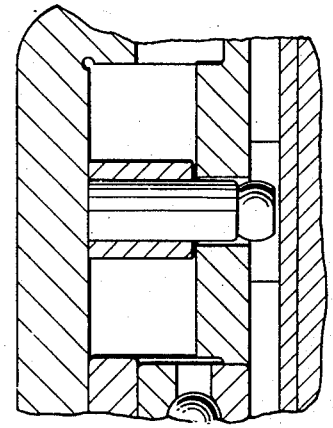
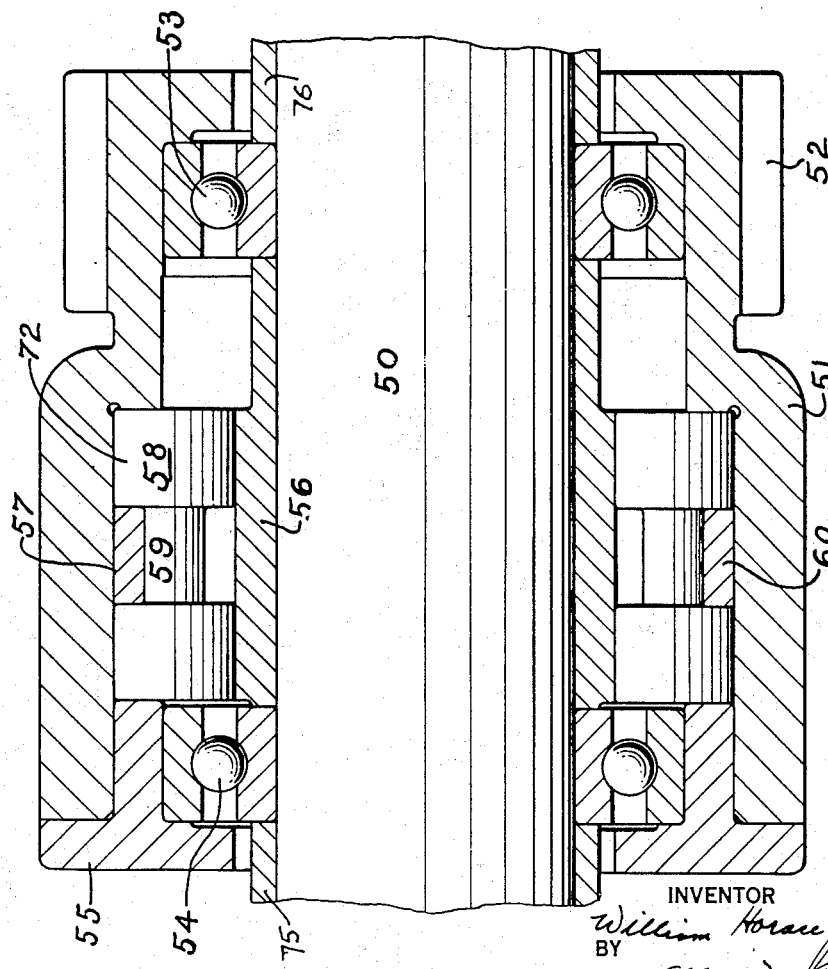
INVENTOR
William Horace Johnson
BY
Albert M. Guestin
ATTORNEY Oct. 21, 1941.    W. H. JOHNSON    2,259,473
ROLLER CLUTCH
Filed Nov. 15, 1939    10 Sheets-Sheet 8
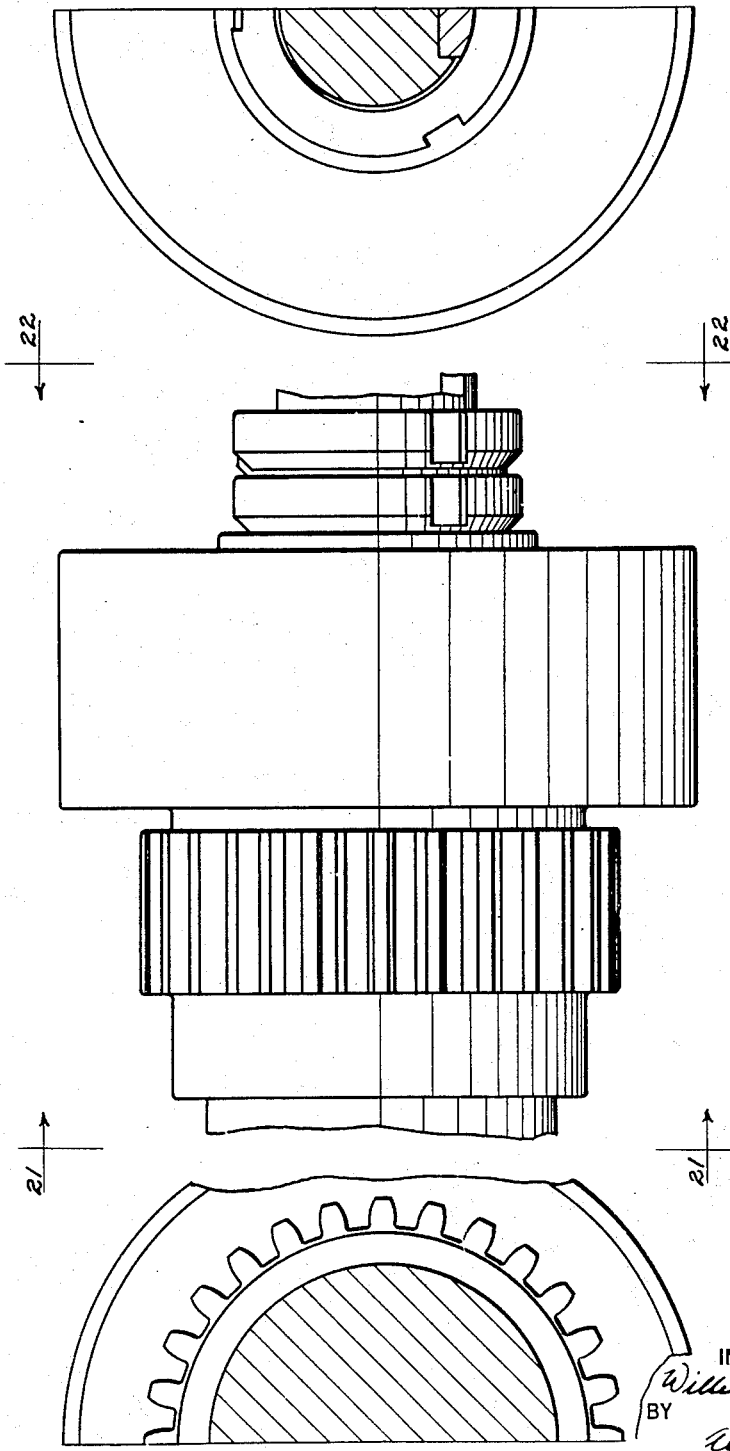
INVENTOR
William Horace Johnson
BY
Albert M. Austin
ATTORNEY

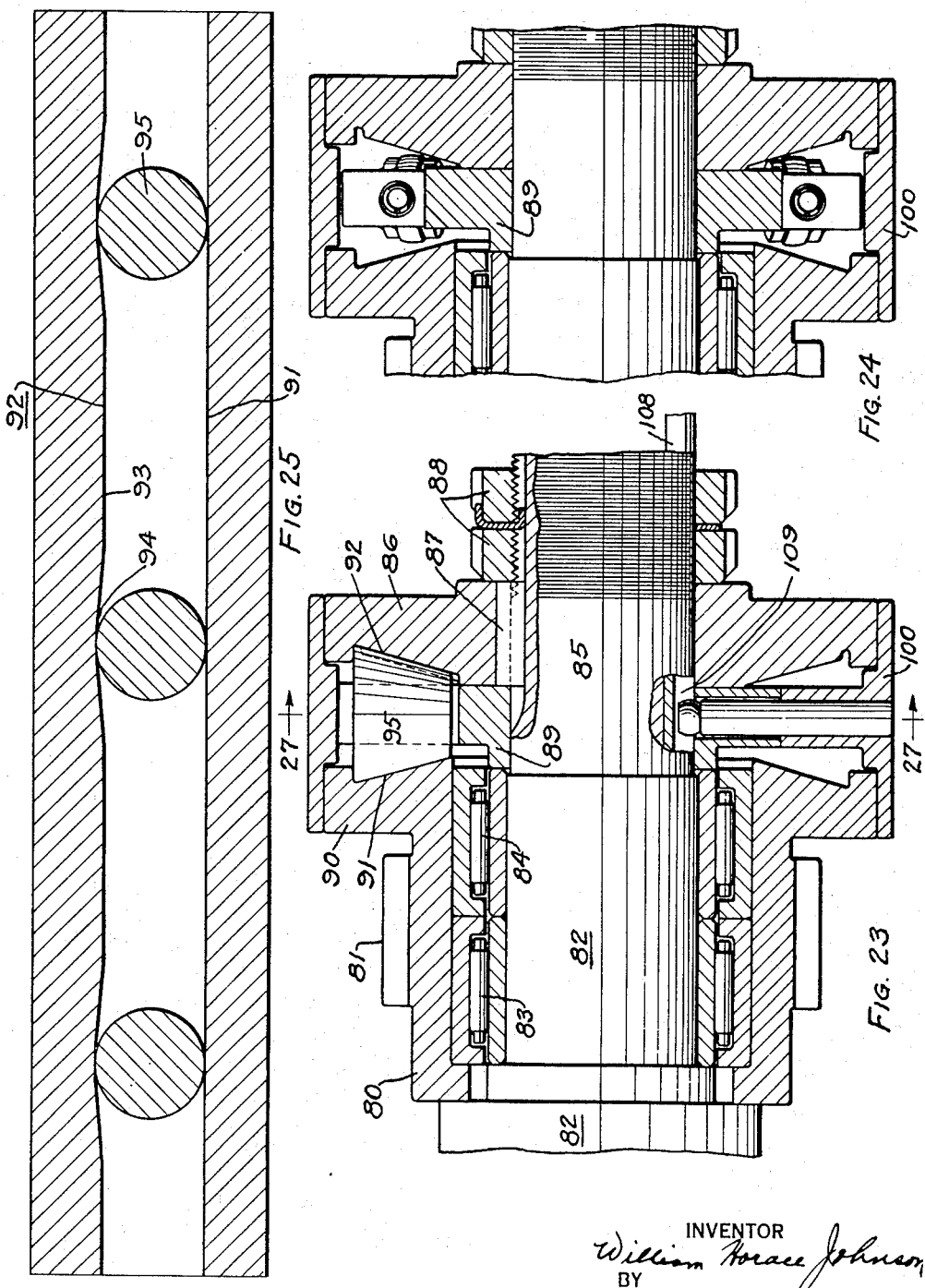

Oct. 21, 1941.  W. H. JOHNSON  2,259,473
ROLLER CLUTCH
Filed Nov. 15, 1939   10 Sheets-Sheet 10

INVENTOR
William Horace Johnson
BY
Albert M. Austin
ATTORNEY

Patented Oct. 21, 1941

2,259,473

UNITED STATES PATENT OFFICE 2,259,473

ROLLER CLUTCH

William Horace Johnson, Cranston, R. I., assignor to Weskenson Corporation, Providence, R. I., a corporation of Rhode Island Application November 15, 1939, Serial No. 304,488

13 Claims. (Cl. 192—44)

The invention relates to machine elements and, more particularly, to overrunning clutches.

According to the invention an overrunning clutch is provided with controllable means for changing the direction of overrunning action. This control means may be used with the so-called "three-roll" clutch or any other number of rolls may be provided to obtain the reversible overrunning action. The invention is applicable to both cylindrical rolls operating between generally cylindrical members and to tapered rolls acting between generally radial members. To reduce friction when the main gripping rolls are released, special auxiliary contact rollers may be provided for positioning the main rolls to obtain the desired overrunning action.

The invention also consists in certain new and original features of construction and combination of parts hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 is a vertical longitudinal section taken on the line 1—1 of Fig. 3;

Fig. 2 is a horizontal longitudinal section taken on the line 2—2 of Fig. 3;

Fig. 7 is a detail of the sliding key at line 7—7 of Fig. 6, showing the position of control pin in slot;

Figure 14:
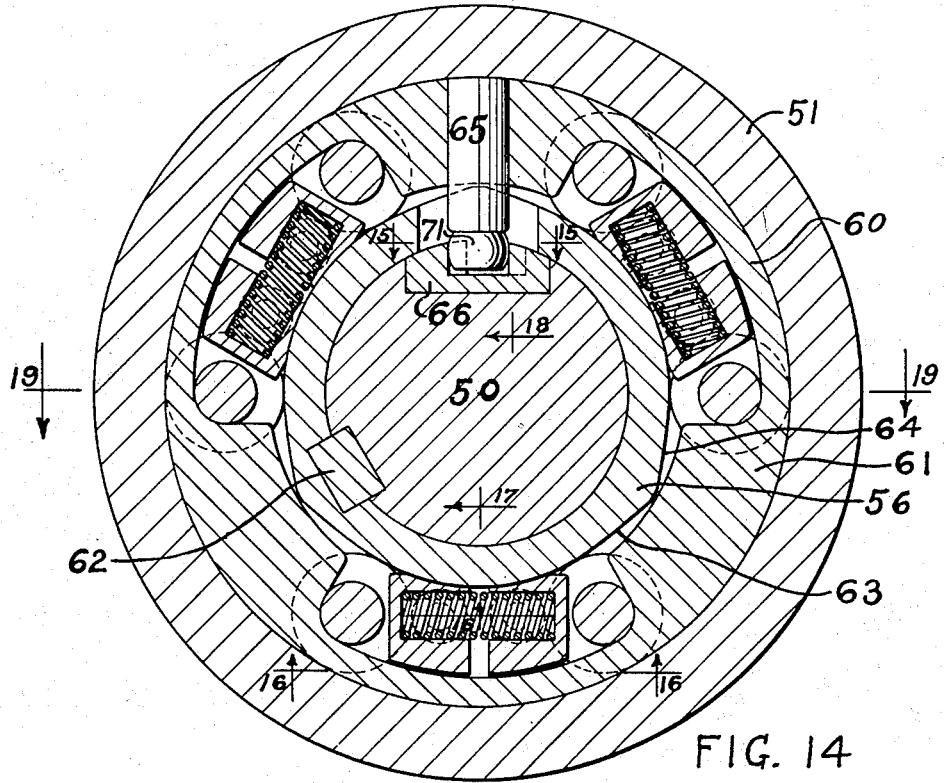
Fig. 14 is a transverse section taken on the line 14—14 of Fig. 12.
Figure 16:
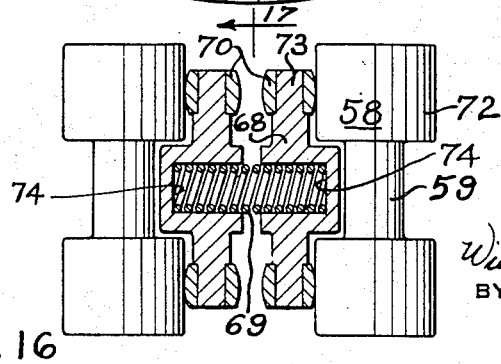
Fig. 16 is a detail taken on the line 16—16 of Fig. 14.
Figure 26:
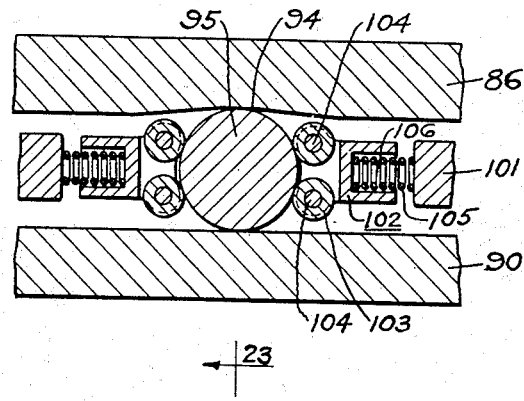
Figure 27:
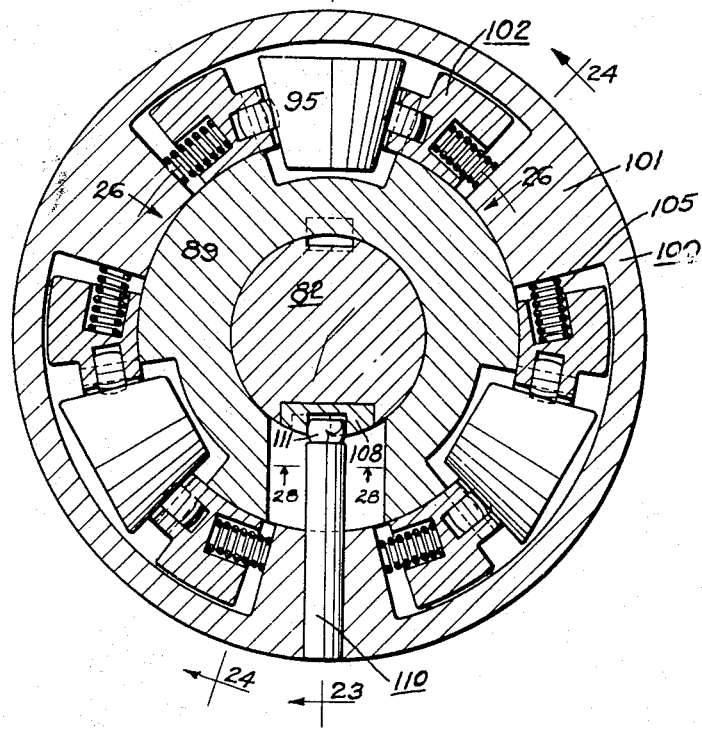

Figs. 17 and 18 are fragmentary details taken on the lines 17—17 and 18—18 respectively of Fig. 14;

Fig. 19 is a longitudinal section taken on the line 19—19 of Fig. 14;

Fig. 20 is a side elevation of still another modified form;

Figs. 21 and 22 are partial sections taken on the lines 21—21 and 22—22 of Fig. 20;

Fig. 23 is a longitudinal section taken on the line 23—23 of Fig. 27;

Fig. 24 is a fragmentary longitudinal section taken on the line 24—24 of Fig. 27;

Fig. 25 is a diagrammatic illustration of a development illustrating the action of the overrunning clutch rollers;

Fig. 26 is a detail view taken on the line 26—26 of Fig. 27;

Fig. 27 is a transverse section taken on the line 27—27 of Fig. 23; and

Figure 28:
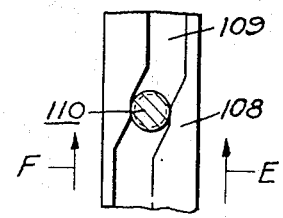

Fig. 28 is a detail view taken on the line 28—28 of Fig. 27.

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Figure 1:
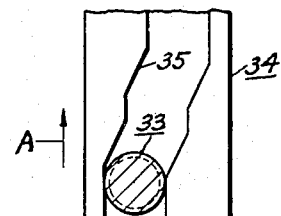

Referring now to Figs. 1–11 of the drawings and more particularly to Figs. 1 and 2, one form consists of a cylindrical cage 12 with gear teeth 13 cut on the outside at one end for driving, or being driven by a gear (not shown). Cage 12 has plain concentric bores 14, 15, 16, 17 and 18.

Cage 12 is carried on shaft 19 through ball bearing assemblies 20 and 21. The inner race of bearing 20 is fitted to shaft 19 and its outer race is fitted to bore 16 of the cage 12. The inner race of bearing 21 is fitted to shaft 19 and its outer race is carried in end cap 22 which is fitted into bore 14 of cage 12. Bores 15, 17 and 18 of cage 12 are for clearance only. The inner races of bearing assemblies 20 and 21 are axially fixed against ring 24 in any desired way, as by members 47 and 48 fixed to the shaft 19.

Figure 5:
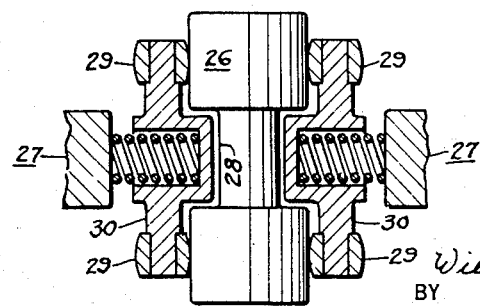
Fig. 5 is a detail section on the line 5—5 of Fig. 3.

Fitted around shaft 19 and keyed therto at 23 is the ring 24 (Figs. 1, 2, 3, 6 and 9) with three specially shaped raised portions 25. Fitted between bore 14 of cage 12 and the ring 24, between the raised portions 25, are three double rolls 26. Each double roll 26 has enlarged roll or drum portions connected by a reduced portion 28. Fitted into bore 14 of cage 12 and free to move therein is a control ring 27 held sideways in the space formed by the reduced portions 28 of roll 26. Bearing on rolls 26, on each side, are smaller contact rollers 29 (Fig. 5). These are axially curved or rounded and are carried on spring blocks 30 and held against rolls 26 by springs 31 bearing against spring blocks 30 and ring 27. Control ring 27 is recessed in three places indicated by 32 in Fig. 3, to receive springs 31, spring blocks 30 and rolls 26.

Contact rollers 29 may be axially held on their shafts on spring blocks 30 in any well-known manner understood by those skilled in the art. As an example, for purposes of illustration, the extreme ends of the shafts may be upset or enlarged slightly after the rollers 29 are placed on them.

Also fitted and held in control ring 27 is a pin 33 having a rounded head 49 which bears in cam groove 35 in sliding key 34. By moving sliding key 34 axially of shaft 19 one way or the other from the neutral position shown in Fig. 4, the ring 27 is turned one way or the other, making the rolls 26 effective on tapers 36 or tapers 37 of the raised portions 25 of ring 24 for operation in one direction or the other.

Figure 4:
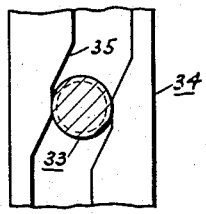
Fig. 4 is a detail showing the sliding key taken at line 4—4 of Fig. 3, showing the position of control pin in slot.
Figure 3:
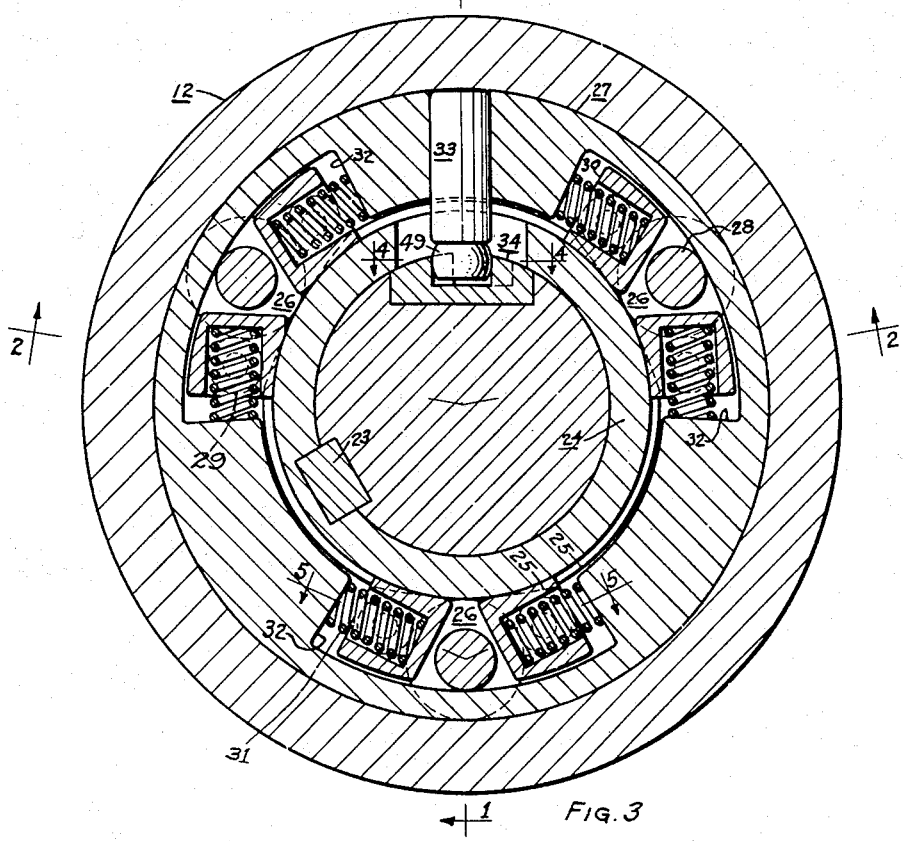
Fig. 3 is a vertical transverse section taken on the line 3—3 of Fig. 1, showing the device in its disengaged or neutral position.

Fig. 3 shows the device in its neutral position with the control pin 33 in the central portion of groove 35 of sliding key 34 and with the rolls 26 held in their free positions between the raised portions 25 of control ring 24 by the balanced springs 31. In this position the cage 12 is free to revolve relative to the shaft 19 in either direction.

Figure 6:
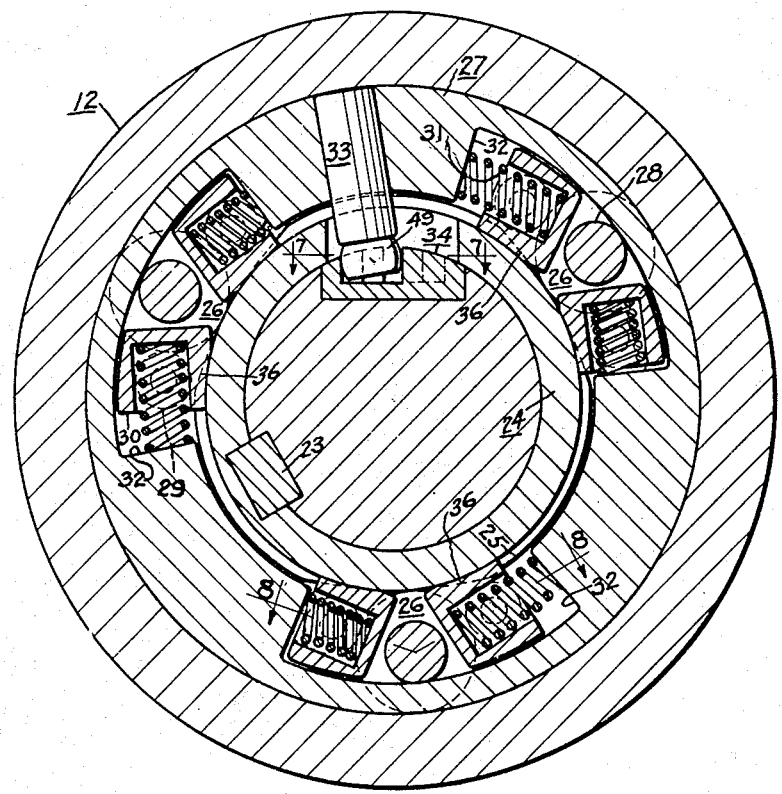
Fig. 6 is a section corresponding to Fig. 3 except that it is shown in its operating position for the shaft to drive the cage clockwise and for the cage to drive the shaft counterclockwise.
Figure 8:
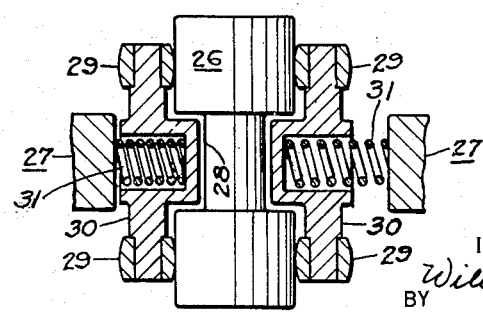
Fig. 8 is a section on the line 8—8 of Fig. 6.

Fig. 6 shows the device in one of its operating positions. The sliding key 34 has been moved along the shaft 19 in the direction of the arrow A in Fig. 7 causing the pin 33 to move to the left which causes the control ring 27 to revolve to the left in Fig. 6. This releases the pressure on one side of the rolls 26 and increases the pressure on the other side which keeps the rolls 26 in contact with the tapers 36 on the raised portions 25 of ring 24. As the shaft 19 revolves in a clockwise direction in Fig. 6, the tapers 36 cause the rolls 26 to grip the cage 12 in its bore 14 and drive the cage 12 also in a clockwise direction. When the shaft 19 reverses its direction of rotation (i. e. rotates counter-clockwise), the rolls 26 revolve and allow the cage 12 to remain at rest or to continue its clockwise rotation, depending upon conditions, but no drive is imparted to cage 12 by shaft 19 rotating in a counter-clockwise direction. With the key 34 in this same position, cage 12 may drive shaft 19 in a counter-clockwise direction.

Figure 10:
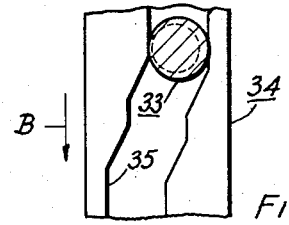
Fig. 10 is a view of the sliding key at line 10—10 of Fig. 9, showing the position of control pin in slot.
Figure 9:
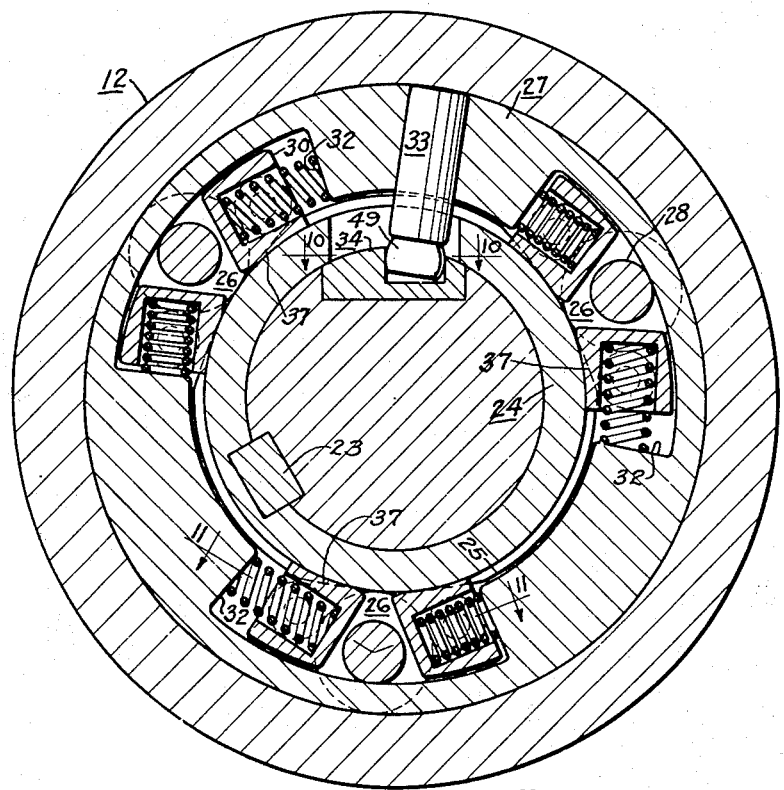
Fig. 9 is a vertical section corresponding to Fig. 3 except that it is shown in its operating position for counter-clockwise drive of the cage by the shaft and clockwise drive of the shaft by the cage.
Figure 11:
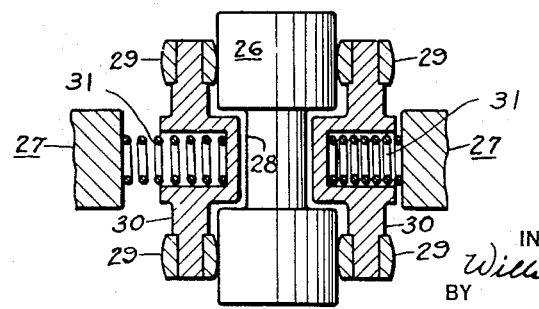
Fig. 11 is a section at line 11—11 of Fig. 9.
Figure 13:
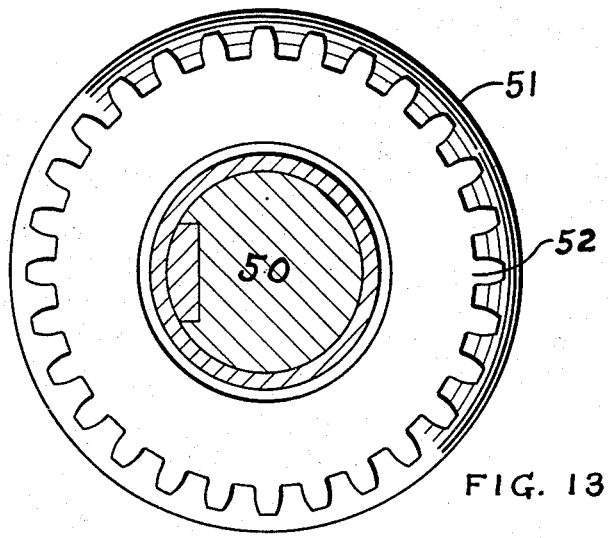
Fig. 13 is a section taken on the line 13—13 of Fig. 12.
Figure 12:
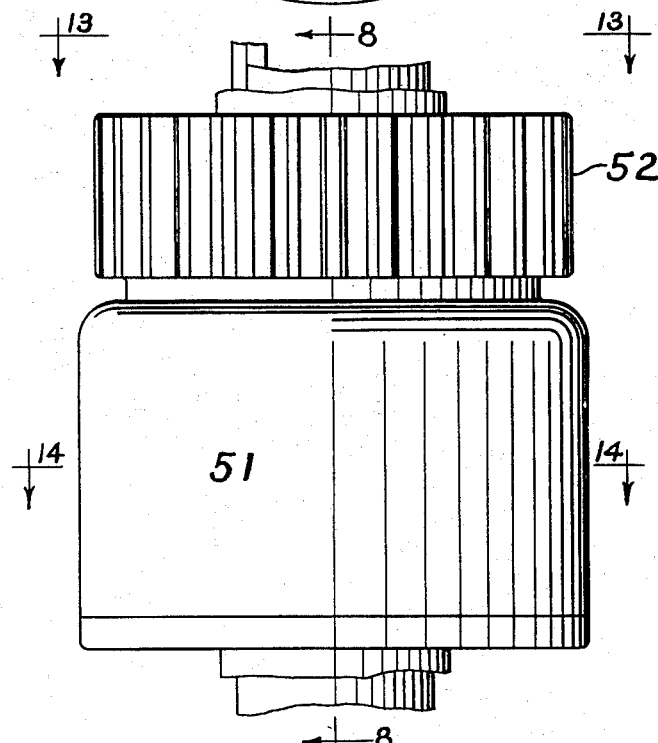
Fig. 12 is a side elevation of a modified form of overriding clutch.

Fig. 9 shows the device in its opposite operating position from that shown in Fig. 6 after sliding key 34 has been moved along shaft 19 in the direction of arrow B in Fig. 10, causing rolls 26 to operate on tapers 37 of ring 24. In each operating position the rolls 26 wedge against the tapers 36 or 37 exerting a powerful gripping action between ring 24 and cage 12, as will be understood by those skilled in the art.

Referring now to the form shown in Figs. 12–19, the shaft, indicated by 50, is suitably supported for rotation in bearings (not shown). Surrounding shaft 50 is cage 51 having a gear 52 which has driving relation with another gear (not shown). A cap 55 closes one end of cage 51 and roller bearing assemblies 53 and 54 are disposed between shaft 50 and the cage body and the cap 55, respectively, so that the cage is supported for rotation relative to, and on, shaft 50.

Ring 56 is keyed to shaft 50 by key 62 and has three raised portions forming inclined surfaces 63 and 64 respectively (Fig. 14). These raised portions cooperate with the smooth cylindrical bore 57 on cage 51, forming ways for the rolls 58 in a manner described more in detail hereinafter. The inner races of ball bearing assemblies 53 and 54 are axially fixed against ring 56 in any suitable way, as by members 75 and 76 fixed to shaft 50.

Fitted into the bore 57 is a control ring 60 having a series of abutments 61 between which are located recesses for the rolls 58. Control ring 60 carries a pin 65 having a spherical head 71 working in a camway 67 in key 66 slidably mounted in an axial groove in shaft 50, being held in sliding position by the ring 56.

In the form shown, six double rolls, instead of three, are provided for the overrunning operation, these rolls being arranged in sets of two, each set occupying a space between abutments 61. The rolls 58 are identical, each being made up of enlarged roller ends 72 connected by a reduced journal or shaft 59. Between each set of rolls is a pair of shoes 68 (Fig. 16), each shoe having two journal portions 73 on which are journalled rollers 70 having axially curved or rounded peripherial surfaces. The shoes 68 have recessed seats 74 seating a helical spring 69 which urge the contact rollers 70 against the main rolls 72, tending to hold the rolls 72 against the tapered surfaces 63 and 64, but not with sufficient pressure to cause any gripping action unless the control ring 60 is shifted from the position shown in Fig. 14 to one of its extreme positions. In Fig. 14, the rolls 72 exert no gripping action with either direction of rotation of cage 51 or of shaft 50.

Suitable means (not shown) are provided for moving sliding key 66 axially of shaft 50 while the shaft is rotating. The position of the key in Figs. 14 and 15 might be said to represent the neutral position since rotation of the shaft 50 in either direction will not drive cage 51 and the rotation of cage 51 in either direction will not drive shaft 50.

Figure 15:
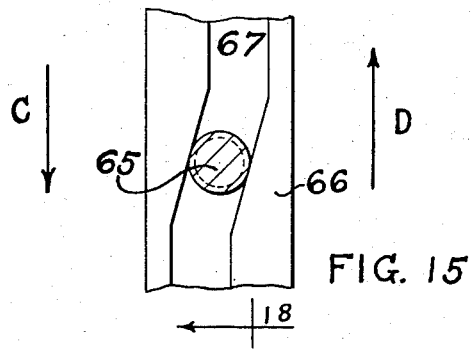
Fig. 15 is a detail taken on the line 15—15 of Fig. 14.

When key 66 is shifted in the direction of the arrow C in Fig. 15, the pin 65 will move to the right (clockwise) in Fig. 14, causing rolls 72 to engage more tightly the wedge surfaces 64 and to be entirely free of the wedge surface 63. The movement of the control ring 60 and the strength of the springs 69, taken with the angle of taper of surface 64, is such that overrunning clutch action will be obtained. When the cage 51 rotates clockwise in Fig. 15, it will move shaft 51 clockwise, but when cage 51 moves counter-clockwise in Fig. 15, it will exert no driving action on shaft 50. Similarly, if shaft 50 moves counter-clockwise in Fig. 14, it will drive cage 51 counter-clockwise, but if shaft 50 moves clockwise in Fig. 14, it will impart no driving action to cage 51.

When sliding key 66 is moved in the direction of arrow D to its other extreme position, the control ring 60 will rotate counter-clockwise in Fig. 14, causing the rolls 72 to engage wedge surfaces 63 and to move clear of wedge surfaces 64, thus obtaining an overrunning action in the opposite direction from that described under movement of key 66 in the direction of arrow C.

Referring now to Figs. 20-28, in this form tapered rolls are used, operating between clutch members which are of general radial configuration as compared with the forms above described where cylindrical rolls are used operating against clutch members which are of general cylindrical configuration.

In this form, the shaft 82 is supported for rotation in a suitable bearing (not shown). Shaft 82 has journalled thereon cage 80 which carries gear 81 having driving relation with a suitable gear (not shown). Cage 80 is journalled on shaft 82 by roller bearing assemblies 83 and 84.

Shaft 82 has a reduced end 85 supporting collar 86 keyed thereto by key 87. Collar 86 is secured to the shaft by suitable nuts and a lock washer indicated, in general, by 88. A spacing collar 89 is disposed between ring 86 and the inner races of roller bearings 83 and 84, which in turn abut a shoulder on the shaft 82.

Cage 80 has a flange or collar 90 having a conical way 91. Collar 86 has a corresponding annular way 92 having depressed portions 94 separated by raised portions 93, as indicated particularly in Figs. 25 and 26. A set of three conical rolls 95 are disposed between ways 91 and 92. It will be understood that the straight elements of the surfaces of ways 91 and 92 and of rolls 95 intersect at a point corresponding to the apices of the cones defined by the conical surfaces of rolls 95.

For controlling the action of the overrunning clutch, a control ring 100 is provided, this ring having a series of abutments 101 between which are recesses in which the rolls 95 are positioned. The control ring 100 has sliding fit with flanges 90 and 86 and carries a pin 110 having a ball end 111 slidable in a camway 109 on sliding key 108. The spacing collar 89 has a recess to permit rotary shifting movement of the pin 110.

Disposed in the recesses between abutments 101 are a series of shoes 102 (Figs. 26 and 27), each shoe carrying a pair of parallel shafts 104 on which are journalled contact rollers 103 having axially rounded peripheries. Each shoe 102, furthermore, has a depressed seat 106 in which is disposed a spring 105 abutting abutment 101, thus holding the contact rollers 103 against the main conical rolls 95.

In the position shown in Figs. 20-28, the parts may be said to be in neutral position, the springs 105 holding the conical rolls 95 in mid positions with respect to the recesses 94, so that no driving relation can take place between shaft 82 and cage 80 in either direction. Axial shifting of key 108 in the direction of the arrow E in Fig. 28 moves the conical rolls 95 against one tapered surface of the recesses 94. Shifting the key 108 in the direction of the arrow F in Fig. 28 causes the rolls 95 to engage the other tapered side of the recess 94. Overrunning clutch action is thus obtained in either one direction of rotation or the other, depending upon which direction the key 108 is shifted.

In each of the above forms different actions are obtained between the cage on the one hand and the supporting shaft on the other, depending upon the position of the shifting key. When the key is in neutral position, no driving relation of any kind can be obtained between cage and shaft and the cage is free to rotate on the shaft in either direction with respect to the shaft. Shifting of the key in one direction or the other causes an overrunning action to be obtained in one direction of rotation or the other. In all of the above forms, three conditions of operation may be obtained: (1) Neutral or total disengagement, whereby no driving action is obtained between shaft and cage in either direction; (2) overrunning clutch operation in one direction, i. e. either shaft or cage member may drive the other member in one direction, but not in the other; and (3) the condition of #2, but with the directions of drive and overrunning reversed.

The invention is suitable in cases for converting a reciprocating drive into a unidirectional drive. Thus, for example, the cage may have an oscillatory or reciprocating motion. When the keys are in neutral position no drive whatsoever is applied to the shaft. When the keys are shifted in one direction, the shaft will rotate unidirectionally in one direction. When the keys are shifted to their other extreme position, the shaft will operate unidirectionally, but in a direction opposite to that of the first direction. Thus, the shifting of keys provides a convenient method of de-clutching, obtaining forward or reverse speed from a single oscillating shaft.

The use of special contact rollers to position the main gripping rolls in proper relation with respect to the wedge gripping surfaces is of advantage in reducing friction during retrograde movements when the main rolls are free to rotate between the clutch ways.

While certain novel features of the invention have been disclosed and are pointed out in the annexed claims, it will be understood that various omissions, substitutions and changes may be made by those skilled in the art without departing from the spirit of the invention.

What is claimed is:

1. In a reversible action, overrunning clutch, first and second power transmitting members having cooperating annular rollways, one of said rollways having equally spaced, raised portions, each raised portion having opposite tapered surfaces, equally spaced rolls disposed between said rollways and between said raised portions, contact rollers, a control ring having means for urging said contact rollers against said rolls, and means for shifting said control ring to move said rolls into operative engagement with either one set of tapered surfaces or the other.

2. In a reversible action, overrunning clutch, first and second power transmitting members having cooperating annular rollways, one of said rollways having three, equally spaced, raised portions, each raised portion having opposite tapered surfaces, three, equally spaced rolls disposed between said rollways and between said raised portions, a control ring having internal abutments providing recesses for said rolls, spring assemblies, one for each recess, each spring assembly comprising a shoe having a contact roller and a spring urging said contact roller against its roll, and means for shifting said control ring to move said rolls into operative engagement with either one set of tapered surfaces or the other.

3. In a reversible action, overrunning clutch, a supporting shaft, a cage journalled on said shaft and having an annular internal channel providing a rollway, a ring having a plurality of external raised portions providing a rollway, each raised portion having opposite tapered surfaces, a plurality of cylindrical rolls disposed between said rollways and between said raised portions, a control ring having internal abutments providing recesses for said rolls, pairs of spring assemblies, one pair for each roll and disposed on opposite sides thereof, each spring assembly comprising a shoe having a contact roller bearing against its roll and a spring bearing against the adjacent abutment, an axially slidable key in said shaft, said key having a camway, a pin in said camway secured to said control ring, whereby axial movement of said key moves said rolls into operative engagement with either one set of tapered surfaces or the other.

4. In a reversible action, overrunning clutch, a supporting shaft, a cage journalled on said shaft and having an annular internal channel providing a rollway, a ring having three, equally spaced, external raised portions providing a rollway, each raised portion having opposite tapered surfaces, three, equally spaced, cylindrical double rolls disposed between said rollways and between said raised portions, each double roll comprising enlarged end portions and a reduced mid-portion, a control ring having internal abutments and reduced connecting portions disposed between said enlarged ends, said abutments providing recesses therebetween for said double rolls, pairs of spring assemblies, one pair for each double roll and disposed on opposite sides thereof, each spring assembly comprising a shoe having contact rollers bearing against said enlarged ends and a spring bearing against said abutments, an axially slidable key in said shaft, said key having a camway, a pin in said camway secured to said control ring, whereby axial movement of said key moves said double rolls into operative engagement with either one set of tapered surfaces or the other.

5. In a reversible action, overrunning clutch, a supporting shaft, a cage journalled on said shaft and having an annular internal channel providing a rollway, a ring having three, equally spaced, external raised portions providing a rollway, each raised portion having opposite tapered surfaces, three pairs of equally spaced, cylindrical double rolls disposed between said rollways and between said raised portions, each double roll comprising enlarged end portions and a reduced mid-portion, a control ring having internal abutments and reduced connecting portions disposed between said enlarged ends, said abutments providing recesses therebetween, a pair of said double rolls being disposed in each recess, spring assemblies, one disposed between each pair of double rolls, each spring assembly comprising a pair of shoes having contact rollers bearing against the enlarged ends of said pair of double rolls, and a spring between said shoes, an axially slidable key in said shaft, said key having a camway, a pin in said camway secured to said control ring, whereby axial movement of said key moves said double rolls into operative engagement with either one set of tapered surfaces or the other.

6. In a reversible action, overrunning clutch, a supporting shaft, a cage journalled on said shaft and having an annular internal channel providing a rollway, a ring having a plurality of external raised portions providing a rollway, each raised portion having sets of opposite tapered surfaces, a plurality of cylindrical rolls disposed between said rollways and between said raised portions, a control ring having internal abutments providing recesses therebetween, a pair of said rolls being disposed in each recess, spring assemblies, one disposed between each pair of rolls, each spring assembly comprising a pair of shoes having contact rollers bearing against said pair of rolls, and a spring between said shoes, an axially slidable key in said shaft, said key having a camway, a pin in said camway secured to said control ring, whereby axial movement of said key moves said rolls into operative engagement with either one set of tapered surfaces or the other.

7. In a reversible action, overrunning clutch, a shaft, a cage having an annular internal channel providing a rollway, a ring having a plurality of external raised portions providing a rollway, each raised portion having opposite tapered surfaces, a plurality of double cylindrical rolls disposed between said rollways and between said raised portions, a control ring having an outer portion surrounding and riding on said rolls and having internal radially extending abutments providing recesses for said rolls, pairs of spring devices, one pair for each roll and disposed on opposite sides thereof, each spring device bearing against its roll and against the adjacent abutment.

8. In a reversible action, overrunning clutch, a shaft, a cage having an annular internal channel providing a rollway, a ring having a plurality of external raised portions providing a rollway, each raised portion having sets of opposite tapered surfaces, a plurality of cylindrical rolls disposed between said rollways and between said raised portions, a control ring having an outer portion surrounding and riding on said rolls and having internal radially extending abutments providing recesses for said rolls, a pair of said rolls being disposed in each recess, spring devices, one disposed between each pair of rolls and bearing against said pair of rolls.

9. In a reversible action, overrunning clutch, a first clutch element having a first radial flange with a tapered channel providing a rollway, a second clutch element having a second radial flange having a tapered annular channel forming a rollway opposite said first rollway, one of said rollways having a plurality of raised portions, each raised portion having opposite tapered surfaces, a plurality of tapered rolls disposed between said tapered rollways and between said raised portions, a control ring having internal abutments between said flanges, said abutments providing recesses therebetween for said rolls, pairs of spring devices, one pair for each roll and disposed on opposite sides thereof and acting against the adjacent abutments.

10. In a reversible action, overrunning clutch, a first clutch element having a first radial flange with a tapered channel providing a rollway, a second clutch element having a second radial flange having a tapered annular channel forming a rollway opposite said first rollway, one of said rollways having a plurality of raised portions, each raised portion having opposite tapered surfaces, a plurality of tapered rolls disposed between said tapered rollways and between said raised portions, a control ring having internal abutments between said flanges, said abutments providing recesses therebetween for said rolls, pairs of spring assemblies, one pair for each roll and disposed on opposite sides thereof, each spring assembly comprising a shoe having spaced contact rollers bearing against its tapered roll and a spring between said shoe and the adjacent abutments.

11. In a reversible action, overrunning clutch, a supporting shaft, a cage, said cage having a drum portion journalled on said shaft and a first radial flange having a tapered annular channel providing a rollway, a second radial flange fixed to said shaft and having a tapered annular channel forming a rollway opposite to said first rollway, said second rollway having three, equally spaced, raised portions, each raised portion having opposite tapered surfaces, three, equally spaced, tapered rolls disposed between said tapered rollways and between said raised portions, a control ring having a drum portion surrounding said radial flanges and having internal abutments between said flanges with reduced portions between said abutments, said abutments providing recesses therebetween for said rolls, pairs of spring assemblies, one pair for each roll and disposed on opposite sides thereof, each spring assembly comprising a shoe having spaced contact rollers bearing against its tapered roll and a spring between said shoe and the adjacent abutment, an axially slidable key in said shaft, said key having a camway, and a pin in said camway secured to said control ring.

12. In a clutch, a first clutch element having a first radial face having an annular channel providing a rollway, a second clutch element having a second radial face having an annular channel forming a rollway axially opposite said first rollway, one of said rollways having a plurality of raised portions, each raised portion having opposite tapered surfaces, a plurality of rolling members disposed between said rollways and between said raised portions, a control ring having abutments between said faces, said abutments providing recesses therebetween for said rolling members, and spring devices urging said rolling members into engagement with said tapered surfaces.

13. In a clutch, first and second clutch elements, one of which has a rollway and the other of which has a plurality of wedging surfaces, a plurality of double rolls, each double roll comprising enlarged drum-shaped ends and a reduced connecting portion, said double rolls cooperating with said rollway and said wedging surfaces to obtain overrunning clutch action, a control ring surrounding and riding in the reduced connecting portions of said double rolls, means for rotating said control ring with respect to said wedging surfaces to change the relation between said wedging surfaces and said double rolls.

WILLIAM HORACE JOHNSON.